May 15, 1951  G. A. WRIGHT  2,553,523
HORIZONTAL SICKLE
Filed Feb. 2, 1948  3 Sheets-Sheet 1
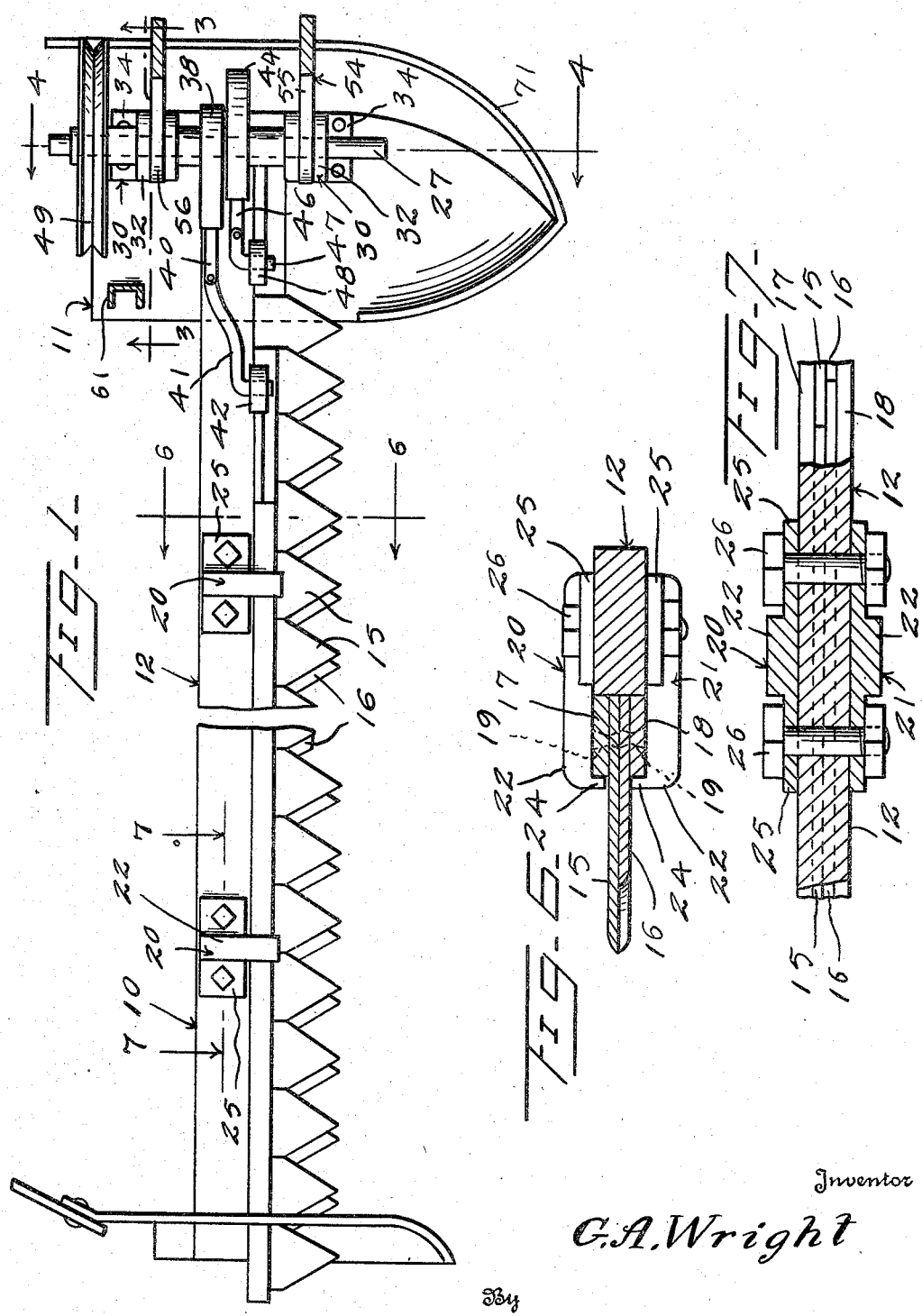
Inventor
G.A.Wright
By
Kimmel & Crowell Attys.

May 15, 1951  G. A. WRIGHT  2,553,523
HORIZONTAL SICKLE
Filed Feb. 2, 1948  3 Sheets-Sheet 2
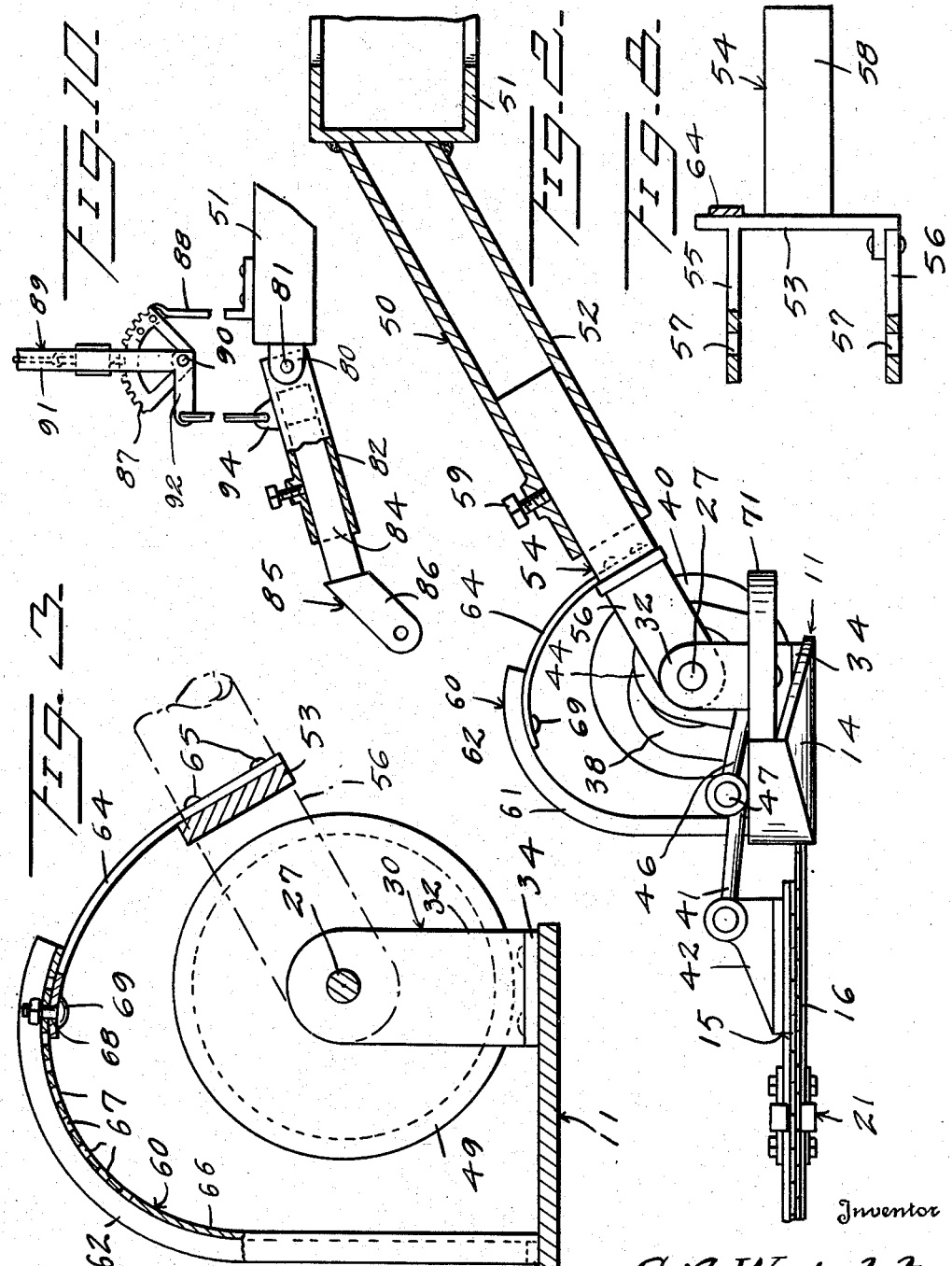
Inventor
G. A. Wright
By
Kimmel & Crowell Attys.

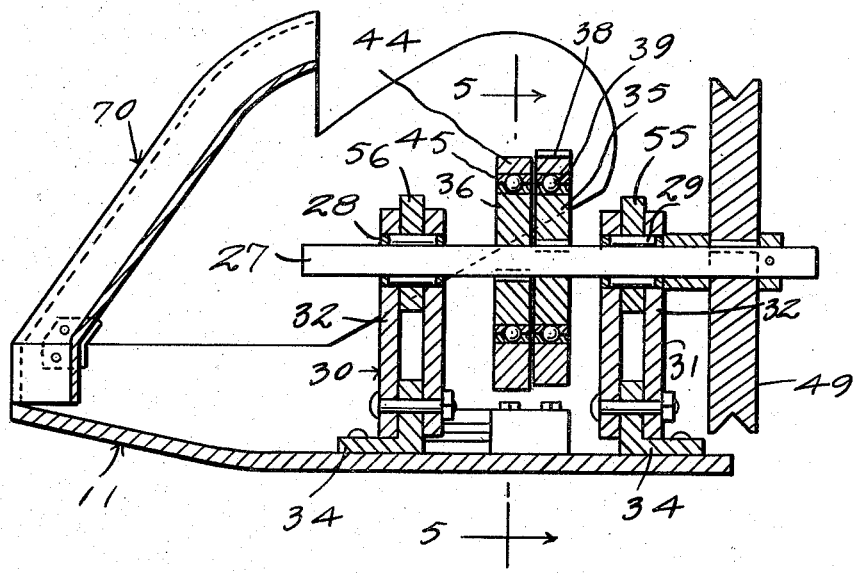
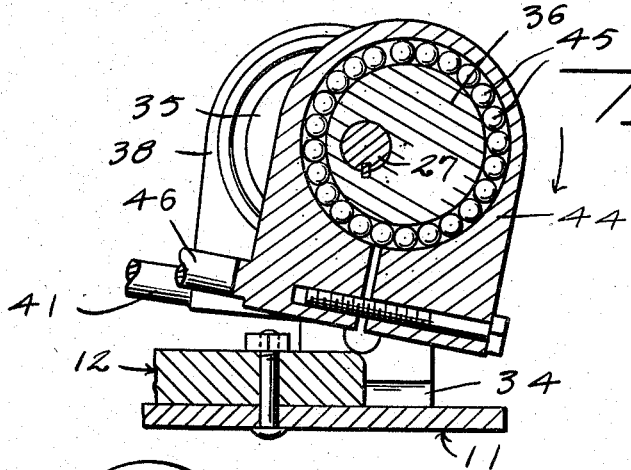
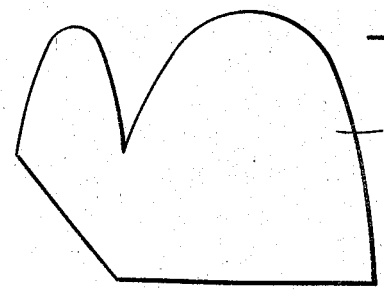

Patented May 15, 1951

2,553,523

UNITED STATES PATENT OFFICE 2,553,523

HORIZONTAL SICKLE

Glenn A. Wright, Springfield, Oreg.

Application February 2, 1948, Serial No. 5,695

3 Claims. (Cl. 56—25)

This invention relates to power sickles and more particularly to sickles attached to and driven by tractors.

It is an object of this invention to provide an improved sickle of the kind to be more particularly described hereinafter, having a pair of reciprocating cutting blades so constructed and arranged in relation to a fixed support therefor that the angle of the blades relative to the ground and to the tractor may be selectively varied by an operator for any particular use to which the sickle may be applied.

Another object of this invention is to provide an improved sickle of this kind in which the power for operating the reciprocating blades may be applied to the support of the blades by a flexible driving member which in turn is connected in the most convenient or desirable manner to the source of power.

Yet another object of this invention is to provide a sickle of this kind which is designed and arranged as an attachment which may be readily applied to or removed from the tractor with the least amount of time and labor.

With the above and other objects in view, my invention consists in the arrangement, combination and details of construction disclosed in the drawings and specification, and then more particularly pointed out in the appended claims.

In the drawings,

Figure 1 is a top plan view, partly broken away and partly in section, of a double horizontal sickle constructed according to an embodiment of this invention.

Figure 2 is an end elevation, partly broken away and partly in section,

Figure 3 is a vertical section taken on the line 3—3 of Figure 1,

Figure 4 is a vertical section taken on the line 4—4 of Figure 1,

Figure 5 is a fragmentary vertical section taken on the line 5—5 of Figure 4,

Figure 6 is a transverse section taken on the line 6—6 of Figure 1,

Figure 7 is a fragmentary detail section taken on the line 7—7 of Figure 1,

Figure 8 is a top plan view, partly broken away and partly in section, of the yoke removed from the assembly, Figure 9 is a front elevation of the cover of the blade actuating means removed from the assembly, Figure 10 is a side elevation, partly broken away and partly in section, of an adjustable sickle support.

Referring to the drawings, the numeral 10 designates generally a double horizontal sickle which is adapted to be attached to and powered by a tractor. The sickle 10 is an improvement over the conventional type of sickles which are carried by tractors, and extend outwardly therefrom for cutting grain, grass, or other growing vegetation. While some of the sickles currently in use are provided with a limited means of adjustment whereby the sickle may be disposed horizontally relative to the tractor and relative to the earth over which it is used, none of the conventional type of sickles are provided with a means for actuating the sliding cutting blades while the sickle itself is disposed at such an inclination to the nomal horizontal position. Usually this raising of the outer end of the sickle is provided merely for the ready transportation of the vehicle and sickle from one place of operation to another. With a structure of the kind to be more specifically described hereinafter, the sickle 10 of this invention may be disposed horizontally or vertically, or at any angle therebetween relative to the tractor and earth, and the cutting blades on the sickle may be operated in the selected disposition of the sickle.

The sickle 10 is formed with an inner shoe member 11 which is adapted to be secured to the tractor and on which is supported an elongated outwardly extending blade supporting arm 12. The shoe 11 is substantially flat and provided with a slightly upwardly inclined toe or front edge 14. The upwardly inclined front end 14 of the shoe 11 will form a sort of sled whereby the shoe may be disposed substantially in engagement with the ground and will slide freely thereover.

The outwardly extending arm or blade supporting rod 12 is suitably fixed to or formed on the shoe 11 and extends outwardly from one side thereof. A pair of reciprocating cutting blades 15 and 16 are carried by the supporting member 12 at the front edge thereof. Both of the blades 15 and 16 are adapted to be reciprocated relative to the supporting arm 12 and are disposed in overlying relation. Each of the blades 15 and 16 is provided at its inner or rear end with an elongated guide arm or rod 17 and 18 respectively. The guide arms 17 and 18 are adapted to be secured to the rear edge of the blades 15 and 16 respectively by rivets 19 or other suitable attaching means.

The blades 15 and 16 are supported on the member 12 by suitable brackets 20 and 21. The bracket 20 is provided with a forwardly extending arm 22 which is adapted to overlie the bar 17 of the upper blade 15. A depending lug 24 extends downwardly from the front or outer end of the arm 22 for engagement with the forward edge of the bar 17. The lower bracket 21 is formed substantially the same as the upper bracket 20, being completely inverted. The blades 15 and 16 are then slidably supported between the brackets 20 and 21 fixedly carried by the supporting member 12.

For attaching the brackets 20 and 21 to the member 12 each of the brackets is provided with an outwardly extending ear as 25, on the opposite sides of the central supporting arm 22 thereof. Bolts as 26 or other suitable attaching means are provided for securing the brackets 20 and 21 to the supporting arm 12. The cutting blades 15 and 16 are adapted to be reciprocated on the supporting arm 12 in opposite directions. For actuating the blades 15 and 16 suitable operating means is provided on the shoe 11.

A shaft as 27 is rotatably supported on the shoe 11 between a pair of end bearings 28 and 29. The bearings 28 and 29 are supported on the shoe 11 by supporting brackets 30 and 31. Each of the brackets 30 and 31 is formed of a pair of upwardly extending spaced apart plates 32. An L-shaped member 34 is fixed on the upper side of the shoe 11 below each end of the shaft 27. The upwardly extending arms 32 are disposed on opposite sides of the upper or vertical leg of the attaching members 34. The bearings 28 and 29 are then supported between each pair of upwardly extending arms 32.

A pair of oppositely disposed cams 35 and 36 are fixed to or otherwise secured on the shaft 27 between the bearings 28 and 29 for rotation with the shaft. A sleeve or cam follower 38 is disposed about the cam 35 and supported thereon by a bearing 39. An outwardly extending arm 40 is fixed to or formed on the cam follower or sleeve 38 and extends in a direction substantially paralled to the supporting member 12. A pitman as 41 is connected between the outer end of the arm 40 and a journal or bearing 42 carried by the inner end of the upper blade 15. A sleeve or cam follower 44 is disposed about the cam 36 and supported thereon by a bearing 45.

An outwardly extending arm 46 carried by the follower 44 is connected by a pitman 47 to a bearing or journal 48 fixed to or otherwise carried by the lower cutter blade 16. As the cams 35 and 36 are disposed on the shaft 27 in opposite relation to each other, rotation of the shaft 27 will effect reciprocating movement of the cutter blades 15 and 16 in an opposite direction on the blade supporting member 12.

A pulley 49 is fixed on the rear end of the shaft 27 and is provided for engagement with a belt or other flexable member which in turn may be connected to the power take-off of the tractor. It is not necessary with this arrangement then that the sickle 10 be disposed in any particular relation to the power take-off of the tractor as the difference in relation of the power take-off and the sickle to any definite point on the tractor may be compensated by the suitable connection of the flexible member between the power take-off and the pulley 49.

For supporting the sickle 10 rockably on the tractor, I have provided a pivot connection between the shaft 27 and a support as 50 carried by the tractor. The support 50 is adapted to be fastened or connected on a part of the tractor as the chassis or frame 51 thereof. The support 50 is preferably made of a tube 52, as shown in Figure 2 of the drawings. A yoke member 54 provides the connection between the shaft 27 and the tube 52. The yoke 54 comprises a pair of horizontally spaced apart outwardly extending arms 55 and 56, connected together by a bight member 53. Each of the arms 55 and 56 is provided with an aligned opening 57 in which the shaft 27 is rotatably engaged. The arms 55 and 56 are disposed about the shaft 27 and the bearings 28 and 29 between the shaft supporting members 30 and 31.

The arms 55 and 56 are substantially the same thickness as the thickness of the vertical leg of the attaching brackets 34 and the arms 55 and 56 are disposed between pairs of supporting plates 32. A central bearing or stud 58 is fixed to or formed on the yoke 54 rearwardly of the arms 55 and 56 on the bight 53. The stud or lug 58 is adapted to be received within the open end of the tube 52 where it may be secured by a set screw 59 carried by the lower end of the tube 52. With this arrangement the connection between the sickle and the tractor, the entire sickle 10 may be removed by sliding the stud 58 from the support 50 upon removing the flexible member between the pulley 49 and the power take-off.

As described to this point, the sickle 10 is loosely carried by the tractor, being freely rockable about the shaft 27. For securing the sickle 10 in a selected angular adjusted position relative to the tractor, I have provided an angular adjusting means 60 carried partly by the sickle 10 and partly by the yoke member 54. An upwardly extending U-shaped channel member 61 is fixed on the shoe 11. The upper end of the channel member 61 is arcuate and bent over the shoe 11 in a direction opposite from the direction in which the member 12 extends. The upper arcuate end 62 of the member 61 is directed toward the tractor.

An elongated member 64 is fixed to or carried by the yoke member 54 for engagement with the supporting member 60 carried by the shoe 11. The member 64 is normally of an arcuate configuration as seen in Figures 2 and 3 of the drawings, and when in use the member 64 will support the entire weight of the sickle 10 and may be slightly flattened between this attachment to the member 60 and the yoke 54. The elongated member 64 is fixed at one end to the end of the bight portion by rivets 65 or other suitable fastening means. The channel member 62 which is carried by the shoe 11 is U-shaped in configuration and the bight 66 thereof is formed with a plurality of openings 67 therethrough.

The openings 67 are mostly disposed in the upper arcuate end of the member 62. The free outer end of the arm 64 is provided with an opening 68 and a bolt 69 is adapted to be engaged through the opening 68 and a selected one of the openings 67 for supporting the sickle 10 in a fixed or determined angular relation relative to the tractor.

As the crankshaft 27 and the cams 35 and 36 are disposed substantially in the open, it is desirable to provide a cover therefor to exclude foreign material from obstructing the normal operation. With this in mind a cover or shield 70 is provided for attachment at its lower end to the upper edge of the shoe 11. The cover 70 is adapted to extend about the outer side of the shoe 11 at its forward end. A bumper as 71 is provided which extends rearwardly from the front end of the shoe 11 in spaced relation to the side edge thereof.

In the use and operation of this adjustable sickle 10, the yoke 54 is initially engaged in the tube 52 where it is secured by the set screw 59. The shoe 11 may by this operation be adjusted to any desired distance relative to the ground. The angular disposition of the sickle 10 is then adjusted by removing the bolt 69 from the members 64 and 60. The sickle 10 is then raised at its outer end or lowered to the desired position about the shaft 27 as a pivot. When the desired angular position is obtained, the bolt 69 is engaged through the opening 68 and the nearest registering opening 67 for securing the sickle in this adjusted position. The adjustment may vary from a perfectly horizontal position at least ninety degrees to a vertical position. The reciprocating cutting blades 15 and 16 will be operated from the cams 35 and 36 on the shaft 27 in any and all positions of the sickle.

The sickle does not necessarily have to be mounted as an attachment on a tractor and need not necessarily be operated from a power take-off from the engine of a tractor. As very little power is required to operate the reciprocating blades, they can be driven by a power obtained from a wheel or wheels of a towed carriage, or horse drawn mower, which contains no power plant.

Another important advantage of this invention is the substantial elimination of vibration, enabling the device to be mounted on a garden tractor or other like frame, and making it possible to manufacture the device in the form of a hand tool.

The sickle can be disposed in a plane below the horizontal as well as above when desired, for working from the top of a terrace or road shoulder in highway mowing.

Guard fingers found on conventional mowers deflect and ride over the material to be cut before the material could be engaged by the cutting teeth. In this mower, guard fingers are not required on the supporting bar. The sickle supported in the manner described will permit the cutting of wet crops in a manner heretofore impossible with the use of such forwardly projecting guard fingers.

In Figure 10 there is shown a modified support for the sickle 10, by which the sickle assembly as a unit may be pivotally adjusted relative to the tractor about the support therefor.

A pair of ears 80 are fixed to the frame 51 and carry a pivot pin 81 therebetween. The inner end of the supporting bar 82 is formed with an opening therethrough, through which the pivot pin 81 loosely engages. The rearwardly extending yoke 84 on the yoke 85 is adjustably supported in the bar 82 in the same manner as the yoke 54 in the bar 50, described above. The arms 86 of the U-shaped yoke 85 are inclined downwardly in relation to the longitudinal axis of the yoke in order to support the sickle below the tractor frame in closer relation.

For adjusting the bar 82 about the pivot point 81, a segmental arcuate rack 87 is fixedly carried by the frame 51, being secured thereon by a bracket 88. An L-shaped lever 89 is pivoted at its lower end on a pin 90 carried below the rack 87. A pawl 91 is carried by the vertical arm 91 of the lever 89 for engagement with the rack 87 to secure the lever in selected adjusted position.

The lower substantially horizontal arm 92 extends outwardly from the pivot point 90. An eye 94 is fixed on the inner end of the bar 82 and a link 95 pivotally engages in the eye 94 and outer end of the arm 92 so that rocking of the lever 89 will effect raising or lowering of the sickle supporting bar 82 about the pivot 81 and the consequent raising and lowering of the sickle 10.

I do not mean to confine myself to the exact details of construction herein disclosed, but claim all variations falling within the purview of the appended claims.

Having thus described my invention what I claim is:

1. Means for adjusting the angular position of a driven reciprocating cutter blade having a drive shaft, a supporting bar, and a mounting for said bar without affecting the operation of the cutter comprising: an arcuate channel member substantially coaxial with and overlying said drive shaft affixed to said supporting bar and having a plurality of apertures therein, an elongated arcuate rod overlying said drive shaft in substantially coaxial relation having an aperture adjacent the extremity thereof and coacting with said channel member affixed to said mounting and bolt means passing through said last mentioned aperture and a selected one of said first mentioned apertures for varying the relative angular position of said supporting bar, and hence said cutter bar, and said mounting.

2. The construction of claim 1 wherein said supporting bar is pivotally mounted on said drive shaft and solely supported thereby.

3. The construction of claim 2 wherein the mounting is pivotally connected to a movable source of power for further angular adjustment thereof, and means including a bellcrank lever having one end linked to said mounting for normally effecting said last mentioned angular adjustment.

GLENN A. WRIGHT.

REFERENCES CITED

The following references are of record in the file of this patent:

UNITED STATES PATENTS

| Number | Name | Date |
|---|---|---|
| 1,806,480 | Manko | May 19, 1931 |
| 2,232,823 | Lull | Feb. 25, 1941 |